United States Patent
Chen et al.

(10) Patent No.: US 12,326,731 B2
(45) Date of Patent: Jun. 10, 2025

(54) SYSTEMATIC INTELLIGENT SYSTEM

(71) Applicant: CAVH LLC, Fitchburg, WI (US)

(72) Inventors: Tianyi Chen, Madison, WI (US); Bin Ran, Fitchburg, WI (US); Shuoxuan Dong, Madison, WI (US); Keshu Wu, Madison, WI (US); Yang Cheng, Middleton, WI (US); Linheng Li, Madison, WI (US); Shen Li, Madison, WI (US); Xiaotian Li, Madison, WI (US); Yanghui Mo, Madison, WI (US); Yifan Yao, Madison, WI (US); Kunsong Shi, Madison, WI (US); Haotian Shi, Madison, WI (US); Hanchu Li, Madison, WI (US)

(73) Assignee: CAVH LLC, Fitchburg, WI (US)

( * ) Notice: Subject to any disclaimer, the term of this patent is extended or adjusted under 35 U.S.C. 154(b) by 189 days.

(21) Appl. No.: 17/537,593

(22) Filed: Nov. 30, 2021

(65) Prior Publication Data
US 2022/0171400 A1    Jun. 2, 2022

Related U.S. Application Data

(60) Provisional application No. 63/120,075, filed on Dec. 1, 2020.

(51) Int. Cl.
  *G05D 1/02*  (2020.01)
  *G05D 1/00*  (2006.01)
(52) U.S. Cl.
  CPC .......... *G05D 1/0219* (2013.01); *G05D 1/0088* (2013.01); *G05D 1/0214* (2013.01)

(58) Field of Classification Search
  None
  See application file for complete search history.

(56) References Cited

U.S. PATENT DOCUMENTS

| | | | |
|---|---|---|---|
| 9,557,183 B1 * | 1/2017 | Ross | G06Q 50/40 |
| 10,380,886 B2 | 8/2019 | Ran et al. | |
| 10,692,365 B2 | 6/2020 | Ran et al. | |
| 2016/0042303 A1 * | 2/2016 | Medina | H04W 4/46 |
| | | | 705/5 |
| 2018/0336780 A1 | 11/2018 | Ran et al. | |

(Continued)

FOREIGN PATENT DOCUMENTS

| | | | | |
|---|---|---|---|---|
| CN | 104702418 A | * | 6/2015 | |
| CN | 109041013 A | * | 12/2018 | ........... H04B 17/382 |
| WO | WO-2019015870 A1 | * | 1/2019 | ............ H04L 5/001 |

OTHER PUBLICATIONS

SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806).

*Primary Examiner* — Shelley Chen
(74) *Attorney, Agent, or Firm* — Casimir Jones, S.C.; Thomas A. Isenbarger

(57) ABSTRACT

The technology relates to a systematic intelligent system (SIS) configured to share data and allocate computing resources among automated driving systems (ADS), e.g., using unified data specifications and interfaces. The SIS comprises systematic intelligent units (SIU) that serve components of ADS, including vehicle intelligent units (VIU) and roadside intelligent units (RIU), and is configured to perform methods to serve an entire trip.

23 Claims, 10 Drawing Sheets

(56) References Cited

U.S. PATENT DOCUMENTS

| | | |
|---|---|---|
| 2019/0096238 A1 | 3/2019 | Ran et al. |
| 2019/0171208 A1* | 6/2019 | Magalhães de Matos .................. G06N 20/00 |
| 2019/0244518 A1* | 8/2019 | Cheng .................. G05D 1/0088 |
| 2019/0244521 A1* | 8/2019 | Ran .......................... G08G 1/22 |
| 2019/0340921 A1 | 11/2019 | Ran et al. |
| 2020/0005633 A1 | 1/2020 | Jin et al. |
| 2020/0021961 A1 | 1/2020 | Li et al. |
| 2020/0168081 A1 | 5/2020 | Ran et al. |
| 2020/0322763 A1* | 10/2020 | Zhou ....................... H04L 1/003 |
| 2021/0065547 A1 | 3/2021 | Ran et al. |
| 2021/0311491 A1 | 10/2021 | Li et al. |
| 2021/0314752 A1 | 10/2021 | S. P. P |

* cited by examiner

SYSTEMATIC INTELLIGENT SYSTEM

This application claims priority to U.S. provisional patent application Ser. No. 63/120,075, filed Dec. 1, 2020, which is incorporated herein by reference in its entirety.

FIELD

Provided herein is technology relating to automated driving and particularly, but not exclusively, to systems and methods for sharing data and allocating computing resources and functions among automated driving systems.

BACKGROUND

Connected and Automated Vehicles (CAV) that are capable of automated driving under certain conditions are in development. Usage of present CAV technologies is limited by costs (e.g., capital and/or energy costs) associated with the numerous sensors and computation devices provided on CAV, and CAV performance is limited by the functional capabilities of sensors provided on CAV.

SUMMARY

Very recently, technologies have been developed to address some of these problems. For example, an Automated Driving System (ADS) and/or components thereof that addresses these problems is described in, e.g., U.S. Pat. App. Pub. Nos. 20190096238; 20190340921; 20190244521; 20200005633; 20200168081; 20200021961; 20210314752 and 20210065547; in U.S. Pat. App. Ser. No. 63/004,551; and in U.S. Pat. Nos. 10,380,886; and 10,692,365, each of which is incorporated herein by reference.

ADS are able to facilitate automated driving by providing supplemental functionalities to overcome the limitations of CAV. For instance, some ADS comprise a supporting roadside infrastructure that provides functions of sensing, prediction, planning and/or decision making, and vehicle control.

Embodiments of the present technology provide systems and methods for implementing an ADS by sharing and/or fusing data, resources, and/or functions among CAV and ADS infrastructures to achieve automated driving for CAV. For example, the present technology provides systems, system designs, and methods for a systematic intelligent system (SIS). The SIS comprises a systematic intelligent unit (SIU) configured to serve (e.g., support) roadside intelligent units (RIU) and vehicle intelligent units (VIU) of one or more (e.g., multiple) ADS, e.g., by managing and/or coordinating resource use and/or allocation among the RIU and VIU from one or more ADS. Accordingly, in some embodiments, the SIU is configured to serve RIU and VIU that are components of and/or provided by different ADS. In some embodiments, the SIS provides unified data specifications and interfaces for coordinating and serving RIU and VIU that are components of and/or provided by different ADS. In some embodiments, tasks and computing resources of RIU and VIU are optimized and allocated by a distribution manager provided by the SIS. Furthermore, embodiments of the technology provide functions and methods for pre-trip, en route, and post-trip services. Storage and backup functions are also provided by SIS.

Accordingly, in some embodiments, the technology relates to a systematic intelligent system (SIS) comprising a system intelligent unit (SIU) configured to serve roadside intelligent units (RIU) and vehicle intelligent units (VIU). In some embodiments, the VIUs are in communication with one or more automated driving systems (ADS). In some embodiments, the VIUs are in communication with a plurality of ADS and each ADS of the plurality of ADS has a different format and/or specification for primitive data and/or a different format and/or specification for interfaces. In some embodiments, the SIS is configured to manage control of a vehicle comprising a VIU by managing and/or coordinating a plurality of different ADS. In some embodiments, the SIS is configured to manage control of a vehicle comprising a VIU (e.g., of a first ADS) by an RIU of a different ADS (e.g., an RIU of a second ADS). In some embodiments, the SIS is configured to manage control of a vehicle comprising a VIU by switching control of the vehicle from a first RIU of a first ADS to a second RIU of a second ADS. In some embodiments, the SIS manages control of a vehicle by one or more ADS during an entire trip. In some embodiments, the SIS manages control of a vehicle during pre-trip, en route, and/or post-trip phases of a trip. In some embodiments, the SIS is configured to perform trip profiling and calibration methods; trip optimization methods; system data storage and/or backup methods; and/or system rewarding methods as described further herein. In some embodiments, trip profiling and calibration methods are based on systematic intelligent databases. In some embodiments, trip optimization methods are for an entire trip (e.g., comprising pre-trip, en route, and post-route phases).

In some embodiments, the SIS is configured to communicate with RIU and/or VIU using unified data interfaces and/or unified data formats. In some embodiments, a plurality of ADS comprise the VIU and/or the RIU.

In some embodiments, the SIS comprises a computing module and/or a storage module.

In some embodiments, the SIS is configured to allocate tasks to VIU and/or RIU (e.g., VIU and/or RIU from one or more ADS; VIU and/or RIU from the same and/or from different ADS). In some embodiments, the SIS is configured to provide supplemental computing resources to a VIU and/or an RIU. In some embodiments, the SIS is configured to perform a distribution management method. In some embodiments, the distribution management method comprises supplementing VIU and/or RIU computing resources. In some embodiments, the distribution management method comprises allocating tasks to VIU and/or RIU. In some embodiments, the distribution management method comprises optimizing computing resources of RIU and VIU by allocating tasks and/or computing resources to RIU and VIU. In some embodiments, the distribution management method comprises allocating computing resources between RIU and VIU; allocating computing resources from idle RIU and/or assisting RIU to one or more other RIU; and allocating computing resources from a computing unit of the SIU to supplement a computing resources insufficiency of an RIU and/or VIU. In some embodiments, the distribution management method comprises allocating computing resources from a computing unit of the SIU for an emergency.

In some embodiments, SIS comprises a distribution manager module. In some embodiments, the distribution manager module is configured to perform a distribution management method. In some embodiments, the distribution manager module is configured to allocate, balance, and/or optimize RIU resources. In some embodiments, the distribution manager module is configured to accept resource requests from an RIU and allocate computation and/or storage resources to the RIU. In some embodiments, the distribution manager module is configured to schedule tasks and/or allocate tasks to RIU. In some embodiments, the distribution manager module is configured to allocate resources from the SIU to an RIU having insufficient resources. In some embodiments, the distribution manager module is configured to allocate resources from an idle RIU and/or from an assisting RIU having spare resources to an RIU having insufficient resources. In some embodiments, the distribution manager module is configured to manage resources using a resource pool comprising an index of resources. In some embodiments, the resource pool stores metadata describing the resources, an index for each resource, and/or a reference to each resource. In some embodiments, the resource pool collects resources for scheduling tasks. In some embodiments, an RIU sends a signal to the distribution manager module after completion of a task by the RIU. In some embodiments, the distribution manager module adds an index for an RIU to the resource pool. In some embodiments, the resource pool comprises SIU resources. In some embodiments, the SIU resources are allocated by the distribution manager module to an RIU when the resource pool has insufficient resources from assisting RIU or idle RIU, and/or when the resource pool has no RIU resources for allocation. In some embodiments, the distribution manager module is configured to perform a status update method. In some embodiments, the status update method comprises updating the resource status of an RIU. In some embodiments, updating the resource status of an RIU comprises checking for the presence of an insufficient computing resource signal produced by the RIU. In some embodiments, the status update method comprises scheduling use of computing resources according to the insufficient resource signal. In some embodiments, the status update method comprises updating the resource status of an RIU after scheduling use of computing resources. In some embodiments, the status update method is performed for each RIU in a plurality of RIU (e.g., a plurality of RIU from one or more ADS; a plurality of RIU from the same or different ADS).

In some embodiments, the distribution manager module is configured to perform a targeting method. In some embodiments, the targeting method comprises identifying an RIU having insufficient resources. In some embodiments, identifying an RIU having insufficient resources comprises requesting the resource status and/or determining the resource status of the RIU and/or detecting a resource request signal from the RIU. In some embodiments, identifying an RIU having insufficient resources comprises determining the location of the RIU having insufficient resources. In some embodiments, the targeting method comprises identifying assisting RIU having spare resources. In some embodiments, identifying assisting RIU having spare resources comprises determining the location of the assisting RIU having spare resources. In some embodiments, the targeting method comprises identifying assisting RIU having spare resources at a distance from an RIU having insufficient resources that minimizes transmission delay between the assisting RIU having spare resources and the RIU having insufficient resources. In some embodiments, an assisting RIU is an idle RIU. In some embodiments, the targeting method comprises identifying idle RIU having spare resources. In some embodiments, identifying idle RIU having spare resources comprises determining the location of the idle RIU having spare resources. In some embodiments, the targeting method comprises identifying idle RIU having spare resources at a distance from an RIU having insufficient resources that minimizes transmission delay between the idle RIU having spare resources and the RIU having insufficient resources.

In some embodiments, the distribution manager module is configured to perform a task assignment method. In some embodiments, the task assignment method comprises identifying an assisting RIU, e.g., an RIU having computing resources that are sufficient to complete tasks of the RIU and having additional, spare computing resources. In some embodiments, the distribution manager module adds the spare computing resources to the resource pool. In some embodiments, the task management method comprises identifying one or more assisting RIU (e.g., first RIU) having (e.g., donating, providing) resources in the resource pool; and providing assistance to an RIU (e.g., second RIU) having insufficient computing resources needed to complete tasks of the RIU (e.g., second RIU) by using spare resources of assisting RIU (first RIU) that provide resources to the resource pool. In some embodiments, the task management method comprises identifying one or more first RIU having resources in the resource pool ("assisting RIU"); and providing assistance to a second RIU having insufficient computing resources needed to complete tasks of the second RIU by using spare resources in the resource pool provided by the first RIU (assisting RIU).

In some embodiments, the SIS is configured to provide a pre-trip service. In some embodiments, the SIS is configured to provide a pre-trip service for a plurality of different ADS. In some embodiments, the pre-trip service establishes a connection between a VIU and the SIU. In some embodiments, the pre-trip service comprises optimizing a trip plan. In some embodiments, the SIU is configured to provide an optimized trip plan to the VIU. In some embodiments, optimizing the trip plan comprises optimizing resources provided by one or more ADS. In some embodiments, the pre-trip service establishes a connection between the SIU and RIU. In some embodiments, the pre-trip service is configured to perform a profiling function. In some embodiments, the profiling function provides a customizable user profile stored in the SIS for a user. In some embodiments, the user profile stores the preferences of a user, a vehicle provide, and/or a driving profile. In some embodiments, the user profile comprises information describing the user, the vehicle profile comprises information and basic parameters of the vehicle, and/or the driving profile comprises information describing the driving behaviors and adaptive automated driving systems on different road sections. In some embodiments, the pre-trip service is configured to train a model describing a trip (e.g., comprising a route, user preferences, RIU to use on the route). In some embodiments, the SIS comprises a systematic intelligent database that records historical data generated during trips. In some embodiments, the model describing a trip is trained using historical data generated during previous trips to provide a trained model. In some embodiments, the trained model provides an optimized user profile. In some embodiments, the trained model is optimized to provide a pre-trip plan with increased accuracy and/or increased speed. In some embodiments, the trained model provides an optimized allocation of resources and/or functions among the SIU, RIU, and/or VIU.

In some embodiments, the pre-trip service is configured to perform a user input function. In some embodiments, the user input function is configured to receive user inputs. In some embodiments, the user inputs comprise a user profile selection and/or origin/destination for a trip. In some embodiments, the user inputs are transmitted from a VIU to the SIU prior to a trip. In some embodiments, the user profile is used to select an optimized user profile saved in SIS. In some embodiments, the user inputs are used to identify an optimal route and/or optimal usage of one or more ADS or ADS components on the route. In some embodiments, the pre-trip service is configured to perform a calibration and optimization function. In some embodiments, the calibration and optimization function calibrates and/or optimizes parameters of a profile model for a trip. In some embodiments, parameters are optimized using: 1) real-time data describing real-time traffic conditions, real-time road conditions, and/or real-time information describing the route; and/or 2) historical data describing historical traffic conditions, historical road conditions, and/or historical information describing the route on other similar trips.

In some embodiments, the pre-trip service is configured to perform a trip profile planning function. In some embodiments, the trip profile planning function generates a trip profile plan using user input and a calibrated and optimized model for the trip. In some embodiments, the trip profile plan comprises one or more recommended routes for the trip. In some embodiments, the trip profile plan comprises a preferred route comprising a trip chain and/or a time schedule. In some embodiments, the trip chain comprises a time schedule and route of sub-trips. In some embodiments, the trip chain comprises a plan for usage of one or more ADS (e.g., RIU of one or more ADS) and/or a plan for switching between one or more ADS (e.g., for switching between RIU of one or more ADS). In some embodiments, the trip chain comprises a list of RIU and/or a sequence of RIU (e.g., from one or more ADS), e.g., that will be used by a vehicle (e.g., by a VIU of a vehicle) during the trip.

In some embodiments, the pre-trip service is configured to perform an execution planning function. In some embodiments, the execution planning function comprises navigation operation planning, guidance operation planning, and/or control operation planning. In some embodiments, the navigation operation planning, guidance operation planning, and/or control operation planning is generated with a trip profile plan. In some embodiments, navigation operation planning comprises route planning and/or route adjusting. In some embodiments, route planning and/or route adjusting comprises planning usage of one or more ADS during the trip. In some embodiments, route planning and/or route adjusting comprises planning driving tasks and/or usage of one or more RIU (e.g., from one or more ADS) during the trip. In some embodiments, guidance operation planning comprises dynamic vehicle control tasks. In some embodiments, dynamic vehicle control tasks comprise vehicle positioning, vehicle following, lane changing, and/or responding to emergencies. In some embodiments, guidance operation planning comprises responding to the roadway, RIU, VIU, and/or the environment when using one or more ADS. In some embodiments, control operation planning comprises providing instant control instructions to vehicles. In some embodiments, the control instructions comprise instructions for lateral and/or longitudinal control of a CAV, e.g., steering, braking, and/or accelerating instructions for a CAV. In some embodiments, the control operation planning comprises collaborating with an RIU to provide instant control instructions to vehicles when using one or more ADS.

In some embodiments, the pre-trip service creates a VIU pool for an RIU; and assigns a VIU to the VIU pool to reserve computational resources or preplan computational resources of the RIU for the VIU. In some embodiments, the pre-trip service establishes a connection between the RIU and SIU. In some embodiments, a planned route comprises the RIU.

In some embodiments, the SIS is configured to provide an en route service. In some embodiments, the SIS is configured to provide an en route service for a plurality of different ADS. In some embodiments, the SIU provides ADS downgrade/upgrade switching services, path switching, real-time broadcasting services, and/or emergency response services. In some embodiments, the ADS downgrade/upgrade switching services comprise sending switching and connecting instructions to a vehicle and/or to an RIU if the vehicle needs to switch from a first ADS to a second ADS on a trip. In some embodiments, an SIU sends the switching and connecting instructions. In some embodiments, the switching and connecting instructions are sent to a vehicle and/or to an RIU according to the deployment of VIU and/or according to an RSU sequence identified during pre-trip planning. In some embodiments, path switching comprises user-active path switching and/or user-passive path switching. In some embodiments, user-active path switching is a path switching initiated by a user. In some embodiments, user-active path switching comprises providing a new trip profile plan using user input provided to a calibrated and optimized trip planning model. In some embodiments, the new trip profile plan comprises a new route. In some embodiments, the SIS comprises a pre-trip module configured to provide a new trip profile plan in response to a user path-switching request. In some embodiments, user-passive path switching is a path switching initiated by the SIS to provide a new route. In some embodiments, user-passive path switching is initiated by the SIS to avoid an accident and/or an emergency.

In some embodiments, the en route service is configured to broadcast real-time information to VIU and/or to RIU. In some embodiments, the SIU is configured to broadcast real-time information to VIU and/or to RIU. In some embodiments, the real-time information comprises deployment information and/or instructions; switching information and/or instructions; and/or emergency information and/or instructions.

In some embodiments, the emergency response services provide information and/or instructions for responding to a system failure or external factors. In some embodiments, a system failure comprises a failure of the SIS and/or of an ADS to perform automated driving functions for vehicles. In some embodiments, external factors comprise vehicle breakdown, accident, weather, or dangerous road conditions. In some embodiments, the emergency response services transmit emergency information and/or instructions to an SIU, from an SIU to the SIS, and/or from the SIS to users and/or vehicles affected by an emergency. In some embodiments, the emergency response services switch a vehicle from a first ADS to a second ADS when the first ADS experiences a failure (e.g., and the second ADS assumes providing services to the vehicle). In some embodiments, the first ADS does not have sufficient functionality to manage traffic and/or to control vehicles safely. In some embodiments, the emergency response services provide path switching functions. In some embodiments, path switching functions provide a path switching solution to a vehicle needing to switch paths.

In some embodiments, the SIS is configured to provide a post-trip service. In some embodiments, the SIS is configured to provide a post-trip service for one or more (e.g., a plurality) of different ADS. In some embodiments, the post-trip service is configured to provide feedback methods, storage methods, and/or backup methods. In some embodiments, the feedback method comprises providing feedback information to a pre-trip service. In some embodiments, the feedback methods comprise comparing: i) a trip connection plan comprising planned connections between a VIU and an SIU and/or between a VIU and a series of RIU for a trip (e.g., a future trip); with ii) a trip connection history comprising actual connections made between a VIU and an SIU and/or made between a VIU and a series of RIU used during said trip (e.g., a past trip); and providing a measure of the match between the trip plan and the trip history. In some embodiments, the feedback methods comprise providing feedback information comprising the measure of the match between the trip connection plan and the trip connection history to a pre-trip service. In some embodiments, the pre-trip service is configured to correct and/or optimize a pre-trip connection plan using feedback information. In some embodiments, the trip connection plan comprises a pre-trip connection plan, a portion of a pre-trip connection plan, an en route connection plan, and/or a portion of an en route connection plan. In some embodiments, the feedback information indicates an insufficient match between the trip connection plan and the trip connection history. In some embodiments, the feedback information comprises a reason for the insufficient match between the trip connection plan and the trip connection history. In some embodiments, an insufficient match between a trip connection plan and a trip connection history indicates that the trip connection plan was not sufficient to complete the trip, did not provide a maximized and/or optimized efficient use of resources during a trip, did not plan correctly for traffic and/or emergencies, etc.

In some embodiments, the feedback methods comprise comparing a trip RIU allocation plan comprising a planned allocation of computing resources to RIU for a trip (e.g., a future trip); with a trip RIU allocation history comprising an actual allocation of computing resources to RIU used during said trip (e.g., a past trip); and providing a measure of the match between the trip RIU allocation plan and the trip RIU allocation history. In some embodiments, the feedback methods comprise providing feedback information comprising the measure of the match between the trip RIU allocation plan and the trip RIU allocation history to a pre-trip service. In some embodiments, the pre-trip service is configured to correct and/or optimize a pre-trip RIU allocation plan using feedback information. In some embodiments, the trip plan comprises a pre-trip RIU allocation plan, a portion of a pre-trip RIU allocation plan, an en route RIU allocation plan, and/or a portion of an en route RIU allocation plan. In some embodiments, the feedback information indicates an insufficient match between the trip RIU allocation plan and the trip RIU allocation history. In some embodiments, the feedback information comprises a reason for the insufficient match between the trip RIU allocation plan and the trip RIU allocation history. In some embodiments, the feedback information is provided to an SIU.

In some embodiments, the feedback methods comprise comparing a trip VIU allocation plan comprising a planned allocation of computing resources to VIU to meet a target automated driving level for a trip (e.g., a future trip); with a trip VIU allocation history comprising an actual allocation of computing resources to VIU used to meet a target automated driving level during a trip (e.g., a past trip;) and providing a measure of the match between the trip VIU allocation plan and the trip VIU allocation history. In some embodiments, the feedback methods comprise providing feedback information comprising the measure of the match between the trip VIU allocation plan and the trip VIU allocation history to a pre-trip service. In some embodiments, the pre-trip service is configured to correct and/or optimize a pre-trip VIU allocation plan using feedback information. In some embodiments, the trip VIU allocation plan comprises a pre-trip VIU allocation plan, a portion of a pre-trip VIU allocation plan, an en route VIU allocation plan, and/or a portion of an en route VIU allocation plan. In some embodiments, the feedback information indicates an insufficient match between the trip VIU allocation plan and the trip VIU allocation history. In some embodiments, the feedback information comprises a reason for the insufficient match between the trip VIU allocation plan and the trip VIU allocation history. In some embodiments, the feedback information is provided to an SIU. In some embodiments, the trip VIU allocation plan and/or the trip VIU allocation history is/are for a route comprising segments served by different ADS. In some embodiments, the feedback methods comprise updating a trip profile with information describing user comfort, route preference, time schedule, trip chain, and/or emergency encounters. In some embodiments, a pre-trip module comprises and/or provides the trip profile and/or updates the trip profile. In some embodiments, the feedback methods comprise transmitting transportation information to a third party.

In some embodiments, the storage methods and/or backup methods comprise storing feedback information. In some embodiments, the storage methods and/or backup methods comprise storing and/or backing up route information, computing resource usage of VIU, user information, and/or computing resource usage of RIU. In some embodiments, the storage methods comprise storing and/or backing up a trip history. In some embodiments, the storage methods comprise storing and/or backing up a trip connection history, a trip RIU allocation history, and/or a trip VIU allocation history. In some embodiments, the feedback information is accessible to third parties. In some embodiments, the system data storage and/or backup methods comprise storing and backing up information for the SIS. In some embodiments, information comprises user input, a trip profile plan, and/or an execution plan; RIU allocation and/or VIU allocation; information describing data broadcasted, ADS switching, and/or route switching; and/or historical data. In some embodiments, the user input, trip profile plan, and/or execution plan is provided by a pre-trip service, a pre-trip module, and/or a pre-trip method. In some embodiments, the RIU allocation and/or VIU allocation is provided by a distribution management service, a distribution management module, and/or a distribution management method. In some embodiments, the information describing data broadcasted, ADS switching, and/or route switching is provided by an en route service, an en route module, and/or an en route method. In some embodiments, the historical data is provided by post-trip service, a post-trip module, and/or a post-trip method.

In some embodiments, the system rewarding methods comprise selecting an ADS. In some embodiments, the system rewarding methods comprise assigning a priority value to an ADS using information comprising user satisfaction, ADS intelligence level, and/or trip safety. In some embodiments, the SIS selects an ADS using a priority value assigned to the ADS. In some embodiments, the SIS ranks a plurality of ADS using a priority value assigned to each ADS of the plurality of ADS.

Also provided herein are methods employing any of the systems described herein for the management of one or more aspects of automated driving of a CAV and/or for the management of one or more aspects of traffic control. The methods include those processes undertaken by individual participants in the system (e.g., drivers, public or private local, regional, or national transportation facilitators, government agencies, etc.) as well as collective activities of one or more participants working in coordination or independently from each other.

Some portions of this description describe the embodiments of the technology in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all steps, operations, or processes described.

In some embodiments, systems comprise a computer and/or data storage provided virtually (e.g., as a cloud computing resource). In particular embodiments, the technology comprises use of cloud computing to provide a virtual computer system that comprises the components and/or performs the functions of a computer as described herein. Thus, in some embodiments, cloud computing provides infrastructure, applications, and software as described herein through a network and/or over the internet. In some embodiments, computing resources (e.g., data analysis, calculation, data storage, application programs, file storage, etc.) are remotely provided over a network (e.g., the internet; CAVH or IRIS communications; a SIS communications and/or network module or component; an ADS communications and/or network component; and/or a cellular network). See, e.g., U.S. Pat. App. Pub. No. 20200005633, incorporated herein by reference.

Embodiments of the technology may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory, tangible computer readable storage medium or any type of media suitable for storing electronic instructions, which may be coupled to a computer system bus. Furthermore, any computing systems referred to in the specification may include a single processor or may be architectures employing multiple processor designs for increased computing capability.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

Figure 1:
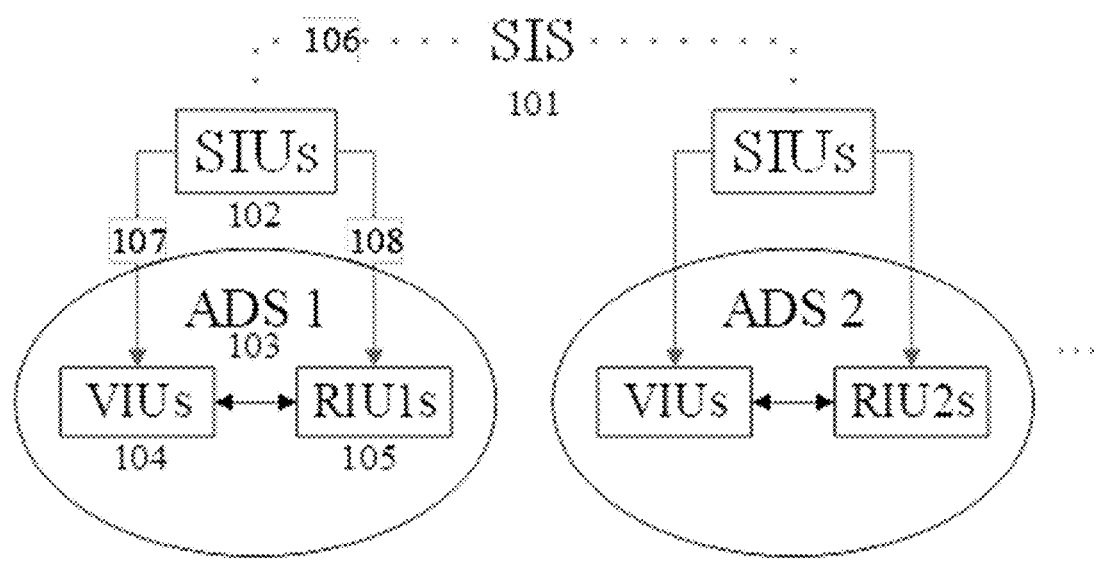
FIG. 1 is a schematic drawing showing an exemplary system structure of the systematic intelligent system. 101: Systematic Intelligent System (SIS); 102: Systematic Intelligent Unit (SIU); 103: Automated Driving System (ADS); 104: Vehicle Intelligent Unit (VIU); 105: Roadside Intelligent Unit (RIU).

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to automated driving and particularly, but not exclusively, to systems and methods for sharing data and allocating computing resources and functions among automated driving systems, e.g., during an entire trip (e.g., pre-trip, en route, and/or post-trip)).

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, the word "presence" or "absence" (or, alternatively, "present" or "absent") is used in a relative sense to describe the amount or level of a particular entity (e.g., component, action, element). For example, when an entity is said to be "present", it means the level or amount of this entity is above a pre-determined threshold; conversely, when an entity is said to be "absent", it means the level or amount of this entity is below a pre-determined threshold. The pre-determined threshold may be the threshold for detectability associated with the particular test used to detect the entity or any other threshold. When an entity is "detected" it is "present"; when an entity is "not detected" it is "absent".

As used herein, an "increase" or a "decrease" refers to a detectable (e.g., measured) positive or negative change, respectively, in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control.

Other terms indicating quantitative changes or differences, such as "more" or "less," are used herein in the same fashion as described above.

As used herein, the term "number" shall mean one or an integer greater than one (e.g., a plurality).

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods.

As used herein, the term "automated driving system" (abbreviated "ADS") refers to a system that performs driving tasks (e.g. lateral and longitudinal control of the vehicle) for a vehicle and thus allows a vehicle to drive with reduced human control of driving tasks and/or without human control of driving tasks.

As used herein, the term "Connected Automated Vehicle Highway System" ("CAVH System") refers to a comprehensive system (e.g., an ADS) providing full vehicle operations and control for connected and automated vehicles (CAV), and, more particularly, to a system controlling CAVs by sending individual vehicles with detailed and time-sensitive control instructions for vehicle following, lane changing, route guidance, and related information. A CAVH system comprises sensing, communication, and control components connected through segments and nodes that manage an entire transportation system. CAVH systems comprise four control levels: a) vehicle; b) roadside unit (RSU, which, in some embodiments, is similar to or the same as an RIU)); c) traffic control unit (TCU); and d) traffic control center (TCC). See U.S. Pat. App. Pub. Nos. 20180336780, 20190244521, and/or 20190096238, each of which is incorporated herein by reference.

As used herein, the term "Intelligent Road Infrastructure System" ("IRIS") refers to a system that facilitates vehicle operations and control for CAVH systems. See U.S. Pat. App. Pub. Nos. 20190244521 and/or 20190096238, each of which is incorporated herein by reference.

As used herein, the term "GPS" refers to a global navigation satellite system (GNSS) that provides geolocation and time information to a receiver. Examples of a GNSS include, but are not limited to, the Global Positioning System developed by the United States, Differential Global Positioning System (DGPS), BeiDou Navigation Satellite System (BDS) System, GLONASS Global Navigation Satellite System), European Union Galileo positioning system, the NavIC system of India, and the Quasi-Zenith Satellite System (QZSS) of Japan.

As used herein, the term "vehicle" refers to any type of powered transportation device, which includes, and is not limited to, an automobile, truck, bus, motorcycle, or boat. The vehicle may normally be controlled by an operator or may be unmanned and remotely or autonomously operated in another fashion, such as using controls other than the steering wheel, gear shift, brake pedal, and accelerator pedal.

As used herein, the term "automated vehicle" (abbreviated as "AV") refers to an automated vehicle in an automated mode, e.g., at any level of automation (e.g., as defined by SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806), each of which is incorporated herein by reference)).

As used herein, the term "allocate", "allocating", and similar terms referring to resource distribution also include distributing, arranging, providing, managing, assigning, controlling, and/or coordinating resources.

As used herein, the term "resource" refers to computational capacity (e.g., computational power, computational cycles, etc.); memory and/or data storage capacity; sensing capacity; communications capacity (e.g., bandwidth, signal strength, signal fidelity, etc.); and/or electrical power.

As used herein, the term "service" refers to a process, a function that performs a process, and/or to a component or module that is configured to provide a function that performs a process.

As used herein, the term "connected vehicle" or "CV" refers to a connected vehicle, e.g., configured for any level of communication (e.g., V2V, V2I, and/or I2V).

As used herein, the term "connected and autonomous vehicle" or "CAV" refers to an autonomous vehicle that is able to communicate with other vehicles (e.g., by V2V communication), with roadside intelligent units (RIU), traffic control signals, and/or other infrastructure (e.g., an ADS or component thereof) or devices. That is, the term "connected autonomous vehicle" or "CAV" refers to a connected autonomous vehicle having any level of automation (e.g., as defined by SAE International Standard J3016 (2014)) and communication (e.g., V2V, V2I, and/or I2V).

As used herein, the term "data fusion" refers to integrating a plurality of data sources to provide information (e.g., fused data) that is more consistent, accurate, and useful than any individual data source of the plurality of data sources.

As used herein, the term "configured" refers to a component, module, system, subsystem, etc. (e.g., hardware and/or software) that is constructed and/or programmed to carry out the indicated function.

As used herein, the terms "determine," "calculate," "compute," and variations thereof, are used interchangeably to any type of methodology, processes, mathematical operation, or technique.

As used herein, the term "reliability" refers to a measure (e.g., a statistical measure) of the performance of a system without failure and/or error. In some embodiments, reliability is a measure of the length of time and/or number of functional cycles a system performs without a failure and/or error.

As used herein, the term "support" when used in reference to one or more components of an ADS, CAVH, CAV, and/or a vehicle providing support to and/or supporting one or more other components of the ADS, CAVH, CAV, and/or a vehicle refers to, e.g., exchange of information and/or data between components and/or levels of the ADS, CAVH, CAV, and/or a vehicles; sending and/or receiving instructions between components and/or levels of the ADS, CAVH, CAV, and/or a vehicles; and/or other interaction between components and/or levels of the ADS, CAVH, CAV, and/or a vehicles that provide functions such as information exchange, data transfer, messaging, and/or alerting.

As used herein, the term "ADS component" or "component of an ADS" refers individually and/or collectively to one or more of components of an ADS and/or a CAVH system, e.g., a VIU, RIU, TCC, TCU, TCC/TCU, TOC, CAV, a supporting subsystem, and/or a cloud component.

As used herein, the term "roadside intelligent unit" (abbreviated "RIU") may refer to one RIU, a plurality of RIU, and/or a network of RIU.

As used herein, the term "critical point" refers to a portion or region of a road that is identified as appropriate to be provided embodiments of the function allocation technology provided herein. In some embodiments, a critical point is categorized as a "static critical point" and in some embodiments, a critical point is categorized as a "dynamic critical point". As used herein, a "static critical point" is a point (e.g., region or location) of a road that is a critical point based on identification of road and/or traffic conditions that are generally constant or that change very slowly (e.g., on a time scale longer than a day, a week, or a month) or only by planned reconstruction of infrastructure. As used herein, a "dynamic critical point" is a point (e.g., region or location) of a road that is a critical point based on identification of road conditions that change (e.g., predictably or not predictably) with time (e.g., on a time scale of an hour, a day, a week, or a month). Critical points based on historical crash data, traffic signs, traffic signals, traffic capacity, and road geometry are exemplary static critical points. Critical points based on traffic oscillations, real-time traffic management, or real-time traffic incidents are exemplary dynamic critical points.

In some embodiments, critical points are identified using, e.g., historical crash data (e.g., the top 20% (e.g., top 15-25% (e.g., top 15, 16, 17, 18, 19, 20, 21, 22, 23, 24, or 25%)) most frequent crash points in a road system are identified as critical points); traffic signs (e.g., where certain traffic signs (e.g., accident-prone areas) are detected are identified as critical points); traffic capacity (e.g., the top 20% (e.g., top 15-25% (e.g., top 15, 16, 17, 18, 19, 20, 21, 22, 23, 24, or 25%)) highest traffic capacity areas are identified as critical points); road geometry (e.g., roads with critical road geometry (e.g., curves, blind spots, hills, intersections (e.g., signalized intersections, stop sign intersections, yield sign intersections), roundabouts) are identified as critical points); traffic oscillation (e.g., points with significant traffic oscillations are identified as critical points); real-time traffic management (e.g., points with potential traffic management are identified as critical points); and/or real-time traffic incident (e.g., points with traffic incidents (e.g., accident, crash, congestion, construction or maintenance, weather-related event, etc.) or vehicle malfunction are identified as critical points).

As used herein, the terms "microscopic", "mesoscopic", and "macroscopic" refer to relative scales in time and space. In some embodiments, the scales include, but are not limited to, a microscopic level relating to individual vehicles (e.g., longitudinal movements (car following, acceleration and deceleration, stopping and standing) and lateral movements (lane keeping, lane changing)), a mesoscopic level relating to road corridors and/or segments (e.g., special event early notification, incident prediction, merging and diverging, platoon splitting and integrating, variable speed limit prediction and reaction, segment travel time prediction, and/or segment traffic flow prediction), and a macroscopic level relating to an entire road network (e.g., prediction of potential congestion, prediction of potential incidents, prediction of network traffic demand, prediction of network status, prediction of network travel time). In some embodiments, a time scale at a microscopic level is from 1 to 10 milliseconds and is relevant to tasks such as vehicle control instruction computation. In some embodiments, a time scale at a mesoscopic level is typically from 10 to 1000 milliseconds and is relevant to tasks such as incident detection and pavement condition notification. In some embodiments, a time scale at a macroscopic level is longer than 1 second and is relevant to tasks such as route computing.

As used herein, the automation and/or intelligence levels of vehicles (V), infrastructure (I), and system (S) are described with respect to an "intelligence level" and/or an "automation level". In some embodiments, the vehicle intelligence and/or automation level is one of the following: V0: No automation functions; V1: Basic functions to assist a human driver to control a vehicle; V2: Functions to assist a human driver to control a vehicle for simple tasks and to provide basic sensing functions; V3: Functions to sense the environment in detail and in real-time and to complete relatively complicated driving tasks; V4: Functions to allow vehicles to drive independently under limited conditions and sometimes with human driver backup; and V5: Functions to allow vehicles to drive independently without human driver backup under all conditions. As used herein, a vehicle having an intelligence level of 1.5 (V1.5) refers to a vehicle having capabilities between vehicle intelligence 1 and vehicle intelligence level 2, e.g., a vehicle at V1.5 has minimal or no automated driving capability but comprises capabilities and/or functions (e.g., hardware and/or software) that provide control of the V1.5 vehicle by a CAVH system (e.g., the vehicle has "enhanced driver assistance" or "driver assistance plus" capability).

In some embodiments, the infrastructure intelligence and/or automation level is one of the following: I0: No functions; I1: Information collection and traffic management wherein the infrastructure provides primitive sensing functions in terms of aggregated traffic data collection and basic planning and decision making to support simple traffic management at low spatial and temporal resolution; I2: I2X and vehicle guidance for driving assistance, wherein, in addition to functions provided in I1, the infrastructure realizes limited sensing functions for pavement condition detection and vehicle kinematics detection, such as lateral and/or longitudinal position, speed, and/or acceleration, for a portion of traffic, in seconds or minutes; the infrastructure also provides traffic information and vehicle control suggestions and instructions for the vehicle through I2X communication; I3: Dedicated lane automation, wherein the infrastructure provides individual vehicles with information describing the dynamics of surrounding vehicles and other objects on a millisecond time scale and supports full automated driving on CAVH-compatible vehicle dedicated lanes; the infrastructure has limited transportation behavior prediction capability; I4: Scenario-specific automaton wherein the infrastructure provides detailed driving instructions for vehicles to realize full automated driving in certain scenarios and/or areas, such as locations comprising predefined geofenced areas, where the traffic is mixed (e.g., comprises automated and non-automated vehicles); essential vehicle-based automation capability, such as emergency braking, is provided as a backup system in case the infrastructure fails; and I5: Full infrastructure automation wherein the infrastructure provides full control and management of individual vehicles under all scenarios and optimizes a whole road network where the infrastructure is deployed; vehicle automation functionality is not necessary provided as a backup; full active safety functions are available.

In some embodiments, the system intelligence and/or automation level is one of the following: S0: no function; S1: the system provides simple functions for individual vehicles such as cruise control and passive safety function; the system detects the vehicle speed, location, and distance; S2: the system comprises individual intelligence and detects vehicle functioning status, vehicle acceleration, and/or traffic signs and signals; individual vehicles make decisions based on their own information and have partially automated driving to provide complicated functions such as assisting vehicle adaptive cruise control, lane keeping, lane changing, and automatic parking; S3: the system integrates information from a group of vehicles and behaves with ad-hoc intelligence and prediction capability, the system has intelligence for decision making for the group of vehicles and can complete complicated conditional automated driving tasks such as cooperative cruise control, vehicle platooning, vehicle navigation through intersections, merging, and diverging; S4: the system integrates driving behavior optimally within a partial network; the system detects and communicates detailed information within the partial network and makes decisions based on both vehicle and transportation information within the network and handles complicated, high level automated driving tasks, such as navigating traffic signal corridors, and provides optimal trajectories for vehicles within a small transportation network; S5: vehicle automation and system traffic automation, wherein the system optimally manages an entire transportation network; the system detects and communicates detailed information within the transportation network and makes decisions based on all available information within the network; the system handles full automated driving tasks, including individual vehicle tasks and transportation tasks, and coordinates all vehicles to manage traffic.

In some embodiments, the system dimension is dependent on the vehicle and infrastructure dimensions, e.g., as represented by the following equation (S=system automation; V=vehicle intelligence; and I=infrastructure intelligence):

$$S=f(V, I)$$

One of ordinary skill in the art may refer to SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806)), which provides additional understanding of terms used in the art and herein.

Systematic Intelligent System (SIS)

Embodiments of the technology described herein provide a systematic intelligent system (SIS) 101, e.g., having a structure as shown in FIG. 1. In some embodiments, the SIS connects, manages, and controls 106 one or more automated driving systems (ADS) 103 through system intelligent units (SIU) 102.

In some embodiments, the SIS is configured to manage and/or control an ADS provided by any ADS manufacturer and/or any ADS service provider. In some embodiments, the SIS is configured to manage and/or control one or more ADS provided by any of one or more ADS manufacturers and/or any of one or more ADS service providers.

In some embodiments, the technology provides and/or uses a unified data interface and/or a unified data type for an ADS. In some embodiments, the technology provides and/or uses a unified data interface and/or a unified data type for one or more ADS. In some embodiments, the technology provides a unified data type and/or unified data interface for use by the one or more ADS and/or SIS and to provide for management and control of the one or more ADS by the SIS.

In some embodiments, the technology provides an interface between the SIS and an ADS that manages transfer of data and/or instructions between the SIS and the ADS. In some embodiments, the interface translates and/or converts data and/or instructions from the ADS into a format for use by the SIS. In some embodiments, the interface translates and/or converts data and/or instructions from the SIS into a format for use by the ADS. In some embodiments, the SIS translates and/or converts data and/or instructions received from the ADS into a format for use by the SIS. In some embodiments, the ADS translates and/or converts data and/or instructions received from the SIS into a format for use by the ADS. In some embodiments, the SIS translates and/or converts data and/or instructions into a format for use by the ADS prior to sending to the ADS for use by the ADS. In some embodiments, the ADS translates and/or converts data and/or instructions into a format for use by the SIS prior to sending to the SIS for use by the SIS. In some embodiments, translation and/or conversion of data and/or instructions by the SIS, ADS, and/or an interface occurs on the fly and in real-time.

In some embodiments, the interface translates and/or converts data and/or instructions from the ADS using a unified data type and/or unified data interface for use by the SIS. In some embodiments, the interface translates and/or converts data and/or instructions from the SIS using a unified data type and/or unified data interface for use by the ADS. In some embodiments, the SIS translates and/or converts data and/or instructions received from the ADS using a unified data type and/or unified data interface for use by the SIS. In some embodiments, the ADS translates and/or converts data and/or instructions received from the SIS using a unified data type and/or unified data interface for use by the ADS. In some embodiments, the SIS translates and/or converts data and/or instructions using a unified data type and/or unified data interface prior to sending to the ADS for use by the ADS. In some embodiments, the ADS translates and/or converts data and/or instructions using a unified data type and/or unified data interface prior to sending to the SIS for use by the SIS. In some embodiments, translation and/or conversion of data and/or instructions by the SIS, ADS, and/or an interface occurs on the fly and in real-time.

In some embodiments, the SIS connects, manages, and controls a number of ADS that are the same, similar, or different. In some embodiments, the SIS connects, manages, and controls a number of ADS that are different, e.g., a number of different ADS that are provided by different manufacturers; a number of different ADS that are provided by different ADS service providers; a number of ADS that have different requirements for data storage and/or use different formats for data storage; a number of ADS that have different requirements for data transmission and/or use different formats for data transmission; and/or a number of ADS that have different requirements for vehicle control instructions and/or use different formats for vehicle control instructions. In some embodiments, the SIS connects, manages, and controls a number of ADS that are the same or similar, e.g., a number of the same or similar ADS that are provided by the same manufacturer; a number of the same or similar ADS that are provided by the same ADS service provider; a number of ADS that have the same or similar requirements for data storage and/or use the same or similar formats for data storage; a number of ADS that have the same or similar requirements for data transmission and/or use the same or similar formats for data transmission; and/or a number of ADS that have different requirements for vehicle control instructions and/or use different formats for vehicle control instructions.

In some embodiments, SIU interact with RIU 105 and VIU 104 provided by the same and/or different ADS using a unified data interface and/or a unified data type. In some embodiments, the unified data interface and/or a unified data type provides for the integration of primitive data (e.g., from RIU and/or from VIU from the same and/or different ADS) and for allocating and/or supplementing the computing resources of the VIU 107 and RIU 108 (e.g., from RIU and/or from VIU from the same and/or different ADS). In some embodiments, when a CAV is passing a road section that is not controlled by an ADS, the SIU directly communicates with the VIU of the CAV to complete automated driving tasks. Consequently, the technology described herein provides a system (SIS) configured to manage sharing of data (e.g., sensing data provided by a VIU and/or an RIU, weather data, traffic data, event data, accident data, routing data, etc.) among multiple ADS and/or types of ADS; and/or a system (SIS) configured to manage allocating resources (e.g., sensing, communication, storage, and/or computing resources) among multiple ADS and/or types of ADS.

Figure 2:
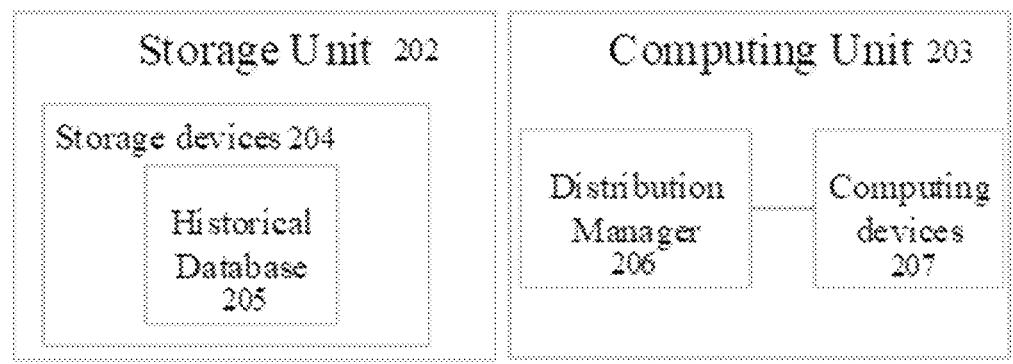
FIG. 2 is a schematic diagram showing an exemplary structure of the systematic intelligent unit. 201: Systematic Intelligent Unit (SIU); 202: SIU storage unit; 203: SIU computing unit; 204: Storage devices in storage unit; 205: SIU Historical database; 206: Distribution Manager module in computing unit; 207: Computing devices (e.g., CPU, GPU).

In some embodiments, e.g., as shown in FIG. 2, the technology provides a systematic intelligent unit (SIU) 201. In some embodiments, the SIU comprises a storage unit 202 and a computing unit 203. In some embodiments, the storage unit comprises a storage device (e.g., a machine-readable storage device for storing digital data (e.g., a semiconductor, magnetic, or optical computer-readable storage medium such as a solid state drive (SSD), hard disk drive (HDD), etc.)) In some embodiments, the storage device comprises a historical database 205. In some embodiments, the historical database 205 stores user information. In some embodiments, the computing units comprise a distribution manager 206 and computing devices 207 (e.g., graphics processing units (GPU), central processing unit (CPU), microprocessor, etc.)

Figure 3:
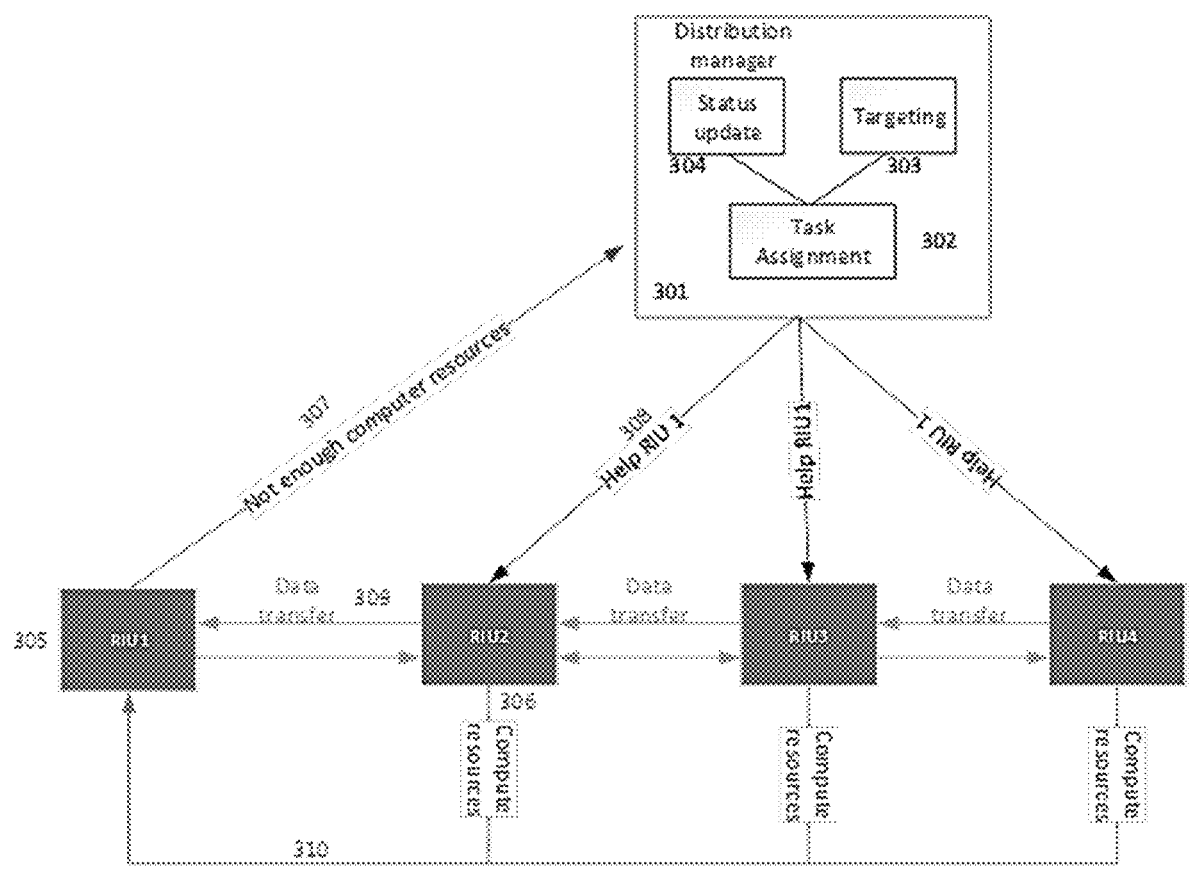
FIG. 3 is a schematic diagram showing the interaction of the distribution manager and RIU. 301: Distribution manager; 302: Task assignment module; 303: Targeting module; 304: Status update module; 305: RIU that is in need of computation resources; 306: RIU that has spare computation resources for sharing; 307: Support request; 308: Assistance instruction; 309: Data transfer between RIU; 310: Computation resources.

In some embodiments, e.g., as shown in FIG. 3, RIU 105 communicate with the distribution manager 301. For example, in some embodiments, an RIU that has insufficient computation resources 305 sends a request for resources to the distribution manager 301. The distribution manager 301 (e.g., comprising sub-modules (e.g., a task assignment module 302, a targeting module 303, and a status update module)) sends assistance request instructions 308 to nearby RIU that has spare computation resources for sharing 306 ("assisting RIU"). In some embodiments, data transfer is performed directly between the RIU 309. In some embodiments, computation resources 310 are allocated, e.g., according to the request and sharing process described above.

Figure 4:
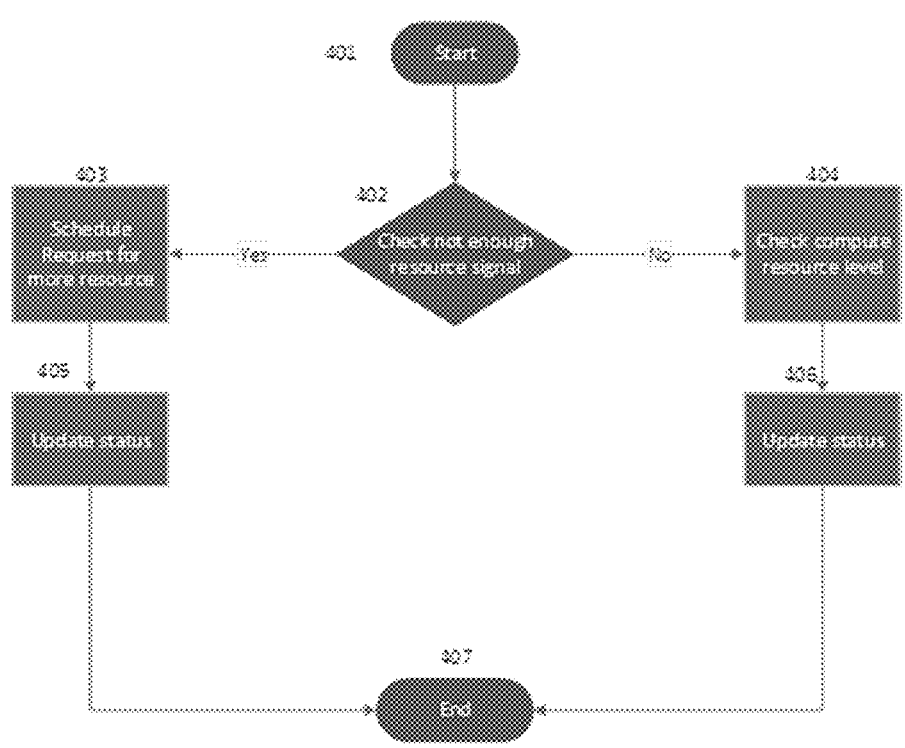
FIG. 4 is a flowchart showing a resource request and status update process performed by the distribution manager. 401: Status update process starts; 402: Check for a signal indicating that an RIU has inadequate computing resources; 403: Schedule a request for more computing resources; 404: Check the computing resource level of the RIU; 405: Update the status of the RIU request for more computing resources; 406: Update the computing resource status of the RIU; 407: Status update process finishes.

In some embodiments, e.g., as shown in FIG. 4, the technology provides a status update process. In some embodiments, the distribution manager 401 performs the status update process. In some embodiments, the status update process starts with checking for an insufficient computing resource signal 402. If an insufficient computing resource signal is present (e.g., detected, received), then a request for supplemental computing resources 403 is scheduled and/or communicated and the status is updated 405. If an insufficient computing resource signal is absent 404, then the status update process checks the computing resource level of the RIU and updates the status 406. Finally, the status update process finishes 407.

Figure 5:
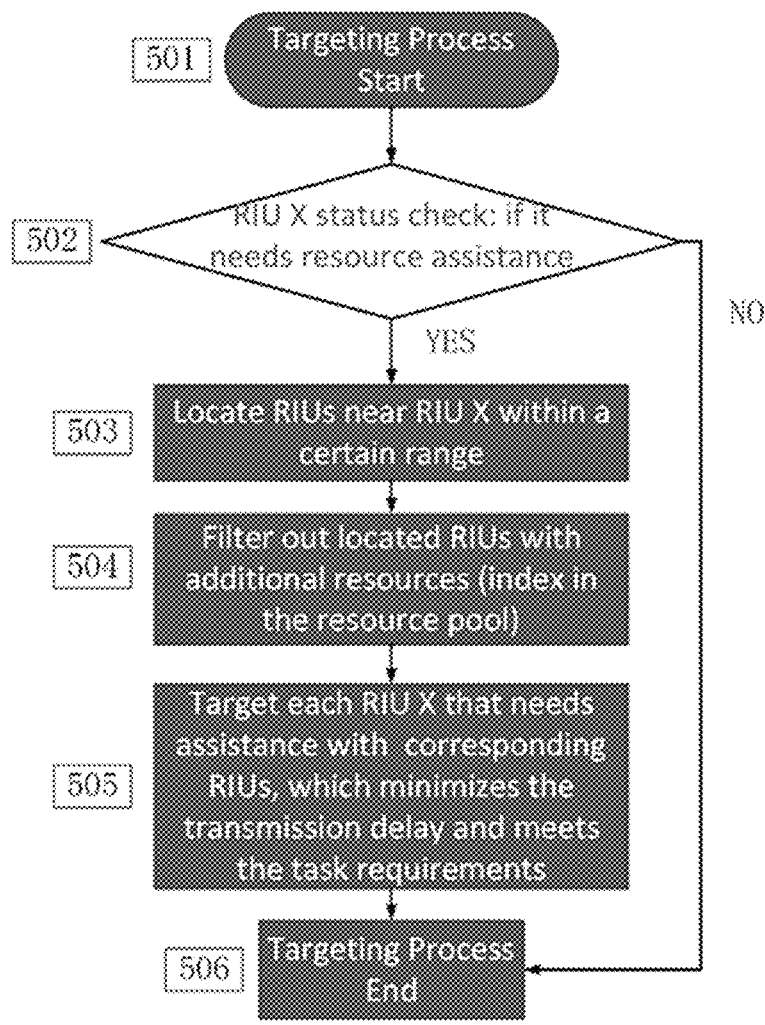
FIG. 5 is a flowchart showing a targeting process performed by the distribution manager. 501: Targeting process starts; 502: Check if RIU needs resource assistance; 503: Identify and/or locate RIU near the RIU that needs assistance (e.g., within a certain range); 504: Filter out identified and/or located RIU with additional resources (e.g., using indexes in the resource pool); 505: Target each RIU that needs assistance with corresponding RIU; 506: Targeting process ends.

In some embodiments, e.g., as shown in FIG. 5, the technology provides a targeting process. In some embodiments, the distribution manager 501 performs the targeting process. In some embodiments, the targeting process starts by checking one or more RIU to determine if an RIU ("RIU X") has insufficient resources 502 and/or to identify an RIU (RIU X) that has insufficient resources 502. If an RIU (RIU X) has insufficient resources, then the distribution manager identifies and/or locates one or more candidate assisting RIU near the RIU (RIU X) having insufficient resources 503. In some embodiments, the distribution manager identifies and/or locates one or more candidate assisting RIU within a certain range that is near the RIU (RIU X) having insufficient resources 503. After locating one or more candidate assisting RIU near the RIU having insufficient resources (e.g., one or more RIU within a certain range of the RIU having insufficient resources (RIU X)), the distribution manager filters the list of one or more candidate assisting RIU to identify assisting RIU with additional (spare and/or surplus) resources 504 and indicates the indexes of the assisting RIU in a resource pool. Finally, the distribution manager targets each RIU that needs assistance (RIU X) with corresponding assisting RIU, e.g., which minimizes the transmission delay and meets the task requirements 505. Then, the targeting process ends 506.

Figure 6:
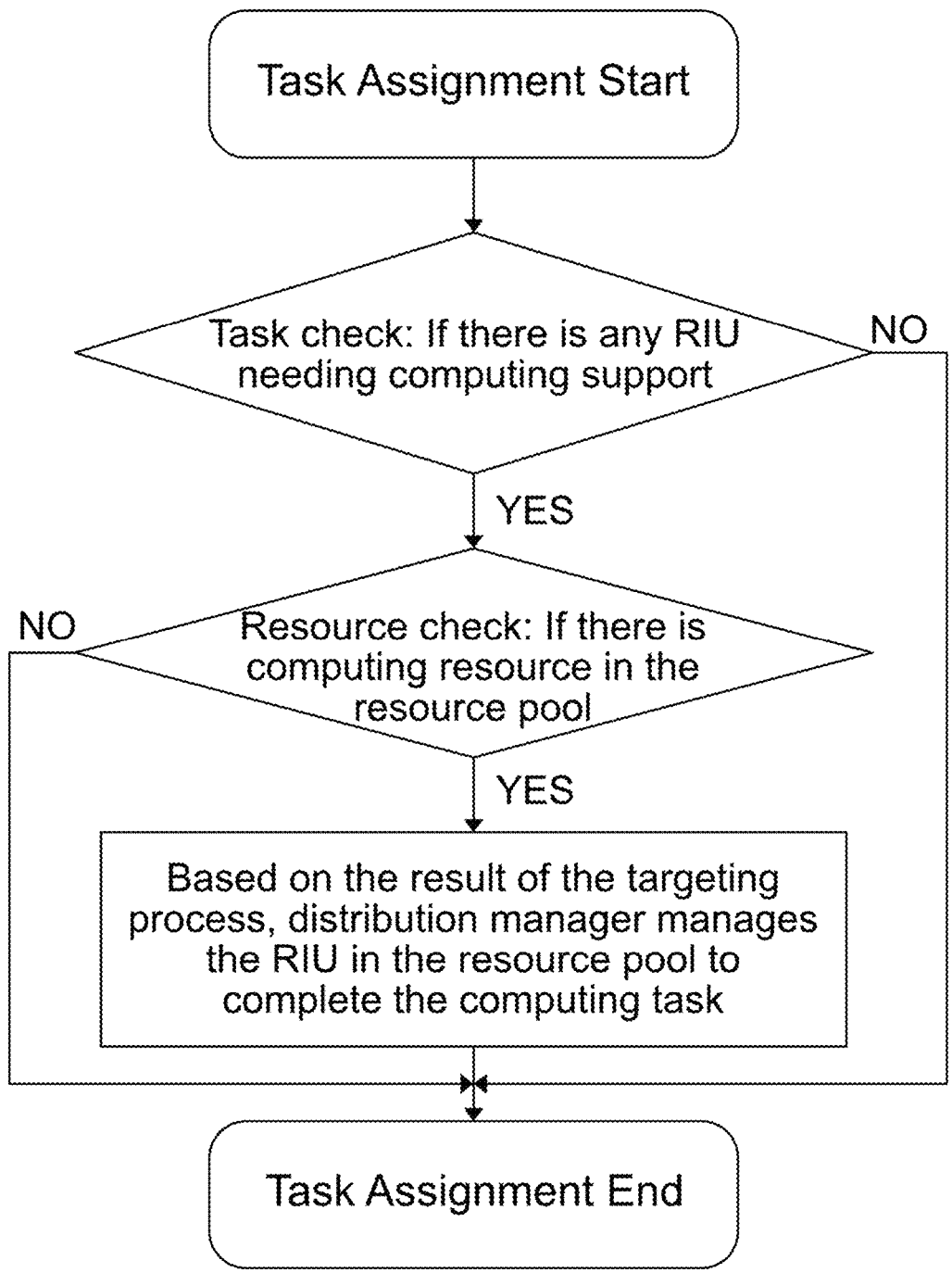
FIG. 6 is a flowchart showing a task assignment process performed by the distribution manager.

In some embodiments, e.g., as shown in FIG. 6, the technology provides a task assignment process. In some embodiments, the distribution manager performs the task assignment process. In some embodiments, the task assignment process starts by checking one or more RIU to determine if the one or more RIU has insufficient computing support (e.g., to perform a computation task). If one or more RIU has insufficient computing support, then the distribution manager checks a resource pool to determine if any other RIU has spare and/or supplemental computing resources ("assisting RIU") and/or to identify one or more other RIU having spare and/or supplemental computing resources ("assisting RIU"). In some embodiments, the distribution manager assigns the computation task to an RIU having supplemental and/or spare computing resources (e.g., based on the result of the targeting process). In some embodiments, the distribution manager assigns the computation task to an RIU having supplemental computing resources that is near the RIU needing computing support, e.g., to minimize transmission delays and system costs. Then, the task assignment process ends.

Figure 7:
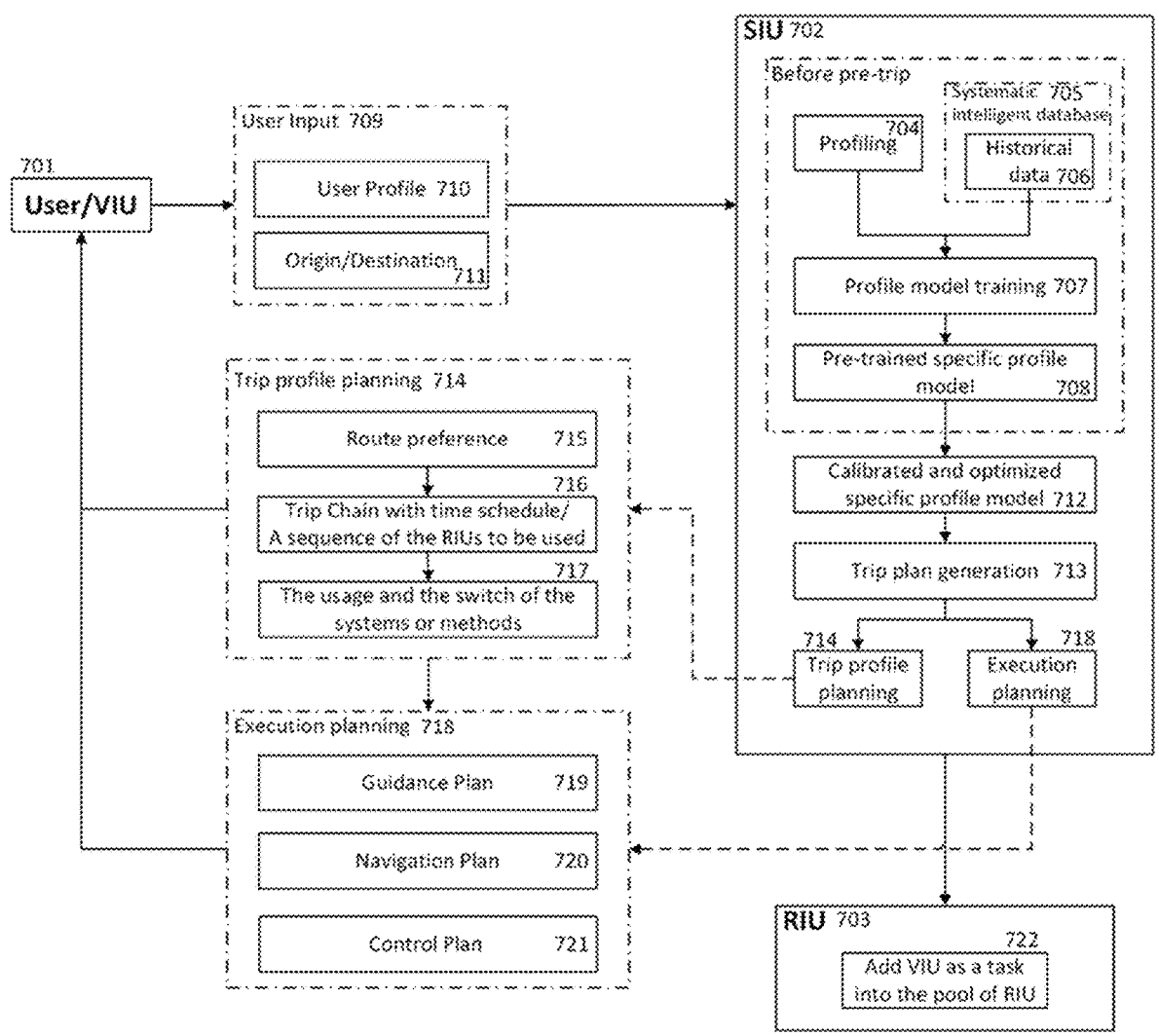
FIG. 7 is a schematic drawing showing a pre-trip service performed by the systematic intelligent system. 709: User input; 710: User profile; 711: Origin/Destination (OD); 712: Calibrated and optimized specific profile model; 713: Trip plan generation; 714: Trip profile planning; 715: Route preference; 716: Trip chain with time schedule and/or a sequence of RIU to be used; 717: Systems and methods for using and/or switching between ADS and/or RIU; 718: Execution planning; 719: Guidance plan; 720: Navigation plan; 721: Control plan; 722: Add VIU as a task into the pool of RIU.

In some embodiments, e.g., as shown in FIG. 7, the technology provides a pre-trip service (e.g., system and/or method). For example, in some embodiments, a profiling process 704 is performed before using the pre-trip service. In some embodiments, the profiling process comprises creating a user profile (e.g., for each user). The pre-trip service comprises training 707 an adaptive pre-trip model 708 (e.g., using historical data 706 in the database 705). Before the trip, the pre-trip process comprises establishing a connection between VIU 701 and SIU 702. In some embodiments, a user provides the input 709 via the VIU 701. In some embodiments, the user input comprises a selection of a user profile 710 and/or the origin and the destination 711 of the current trip. The user input is transmitted to the SIU 702. A profile model is calibrated and optimized 712 using the user input. In some embodiments, the SIU provides an optimal plan 713, which includes the trip profiling plan 714 and the execution plan 718. The trip profile planning 714 comprises the route preference 715. Once the preferred route is selected, the trip chain and a sequence of RIU 716 on the route is determined. In some embodiments, the usage of one or more ADS and/or switching between one or more ADS 717 is also determined (e.g., determining RIU from one or more ADS to use on the trip and planning establishing a series of connections to RIU from one or more ADS on the trip). The execution plan 718 comprises the guidance plan 719, navigation plan 720, and the control plan 721. In some embodiments, the guidance plan 719, navigation plan 720, and the control plan 721 may be provided over a variety and/or range of scopes (e.g., microscopic, mesoscopic, and/or macroscopic in time or space). The pre-trip service also comprises establishing a connection between SIU 702 and RIU 703. The trip plan is transmitted to the RIU 703 to be used during the trip. For each RIU 703, the VIU 701 is assigned to the pool 722 to reserve or preplan computational resources for RIU that will be used to provide automated driving services to the vehicle.

Figure 8:
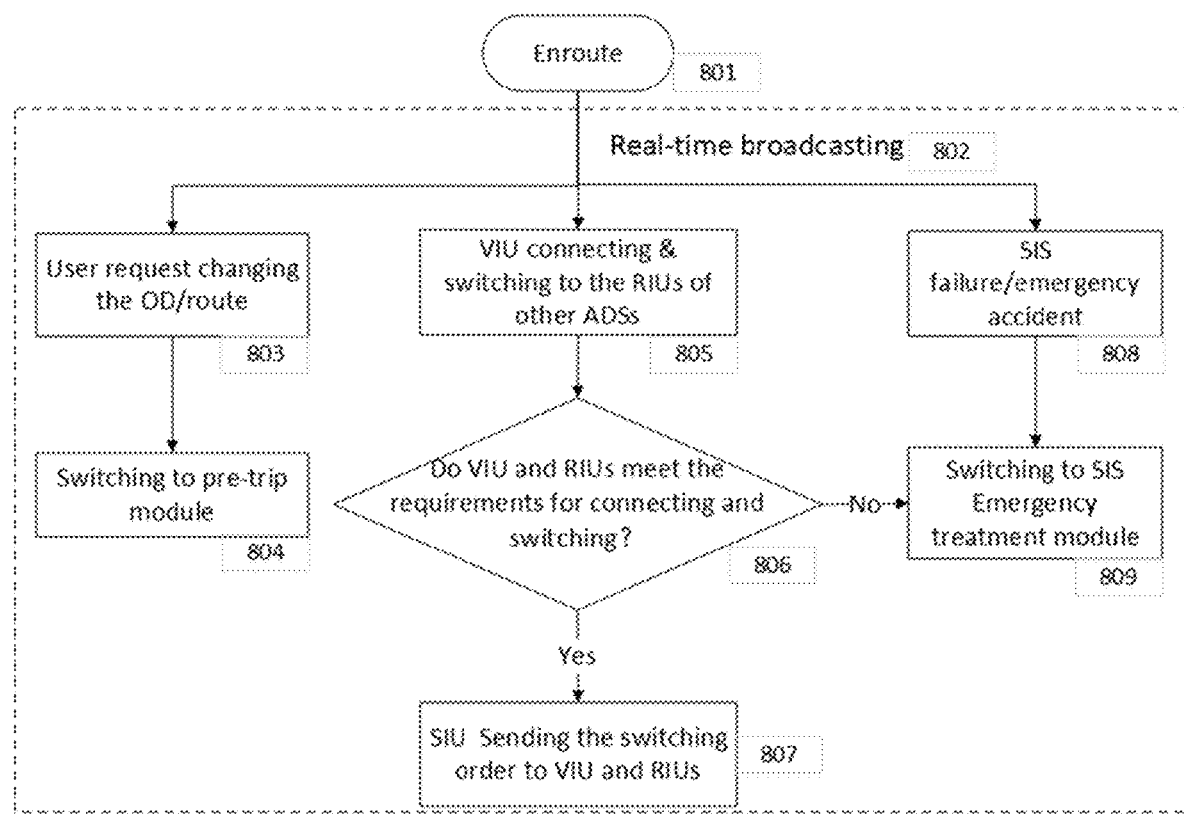
FIG. 8 is a flowchart showing a workflow of an en route service for automated driving systems. 801: System en route service starts; 802: SIU real-time broadcasting service; 803: User requests changing the origin/destination (OD) and/or the route; 804: System switches to pre-trip module; 805: VIU connects to and/or switches to an RIU of another ADS; 806: System checks that the VIU and RIU meet the requirements for connecting and switching; 807: SIU sends the switching command to VIU and RIU; 808: SIS failure, emergency, and/or accident; 809: System switches to SIS emergency treatment module.

In some embodiments, e.g., as shown in FIG. 8, the technology provides an en route service (e.g., system and/or method) 801. In some embodiments, the technology provides an en route service 801 for any ADS, any type of ADS, and/or a plurality of any ADS or any type of ADS. An SIU sends real-time information 802 to VIU and RIU, e.g., deploying information, switching information, emergency start-up, etc. When a user requests changing a path 803, the system switches to a pre-trip module 804. Then, after the user input is provided to the calibrated and optimized model, a new trip profile plan is generated for the user. When the VIU needs to connect to and/or switch to an RIU of a different ADS service during the trip 805, the SIU examines the VIU and/or the RIU to determine if the VIU and/or the RIU meet the requirements for connecting the VIU to the RIU of the different ADS service 806. If the switching conditions are satisfied, the SIU sends switching and connecting instructions to the vehicle (e.g., to the VIU of the vehicle) and to the RIU according to the deployment of VIU and the RIU sequence provided during the pre-trip planning 807. If the switching conditions are not satisfied, the system switches to an SIS emergency treatment module 809. In addition, in some embodiments, when the SIS fails and/or the SIS detects an emergency or accident 808, the system switches to an SIS emergency treatment module 809.

Figure 9:
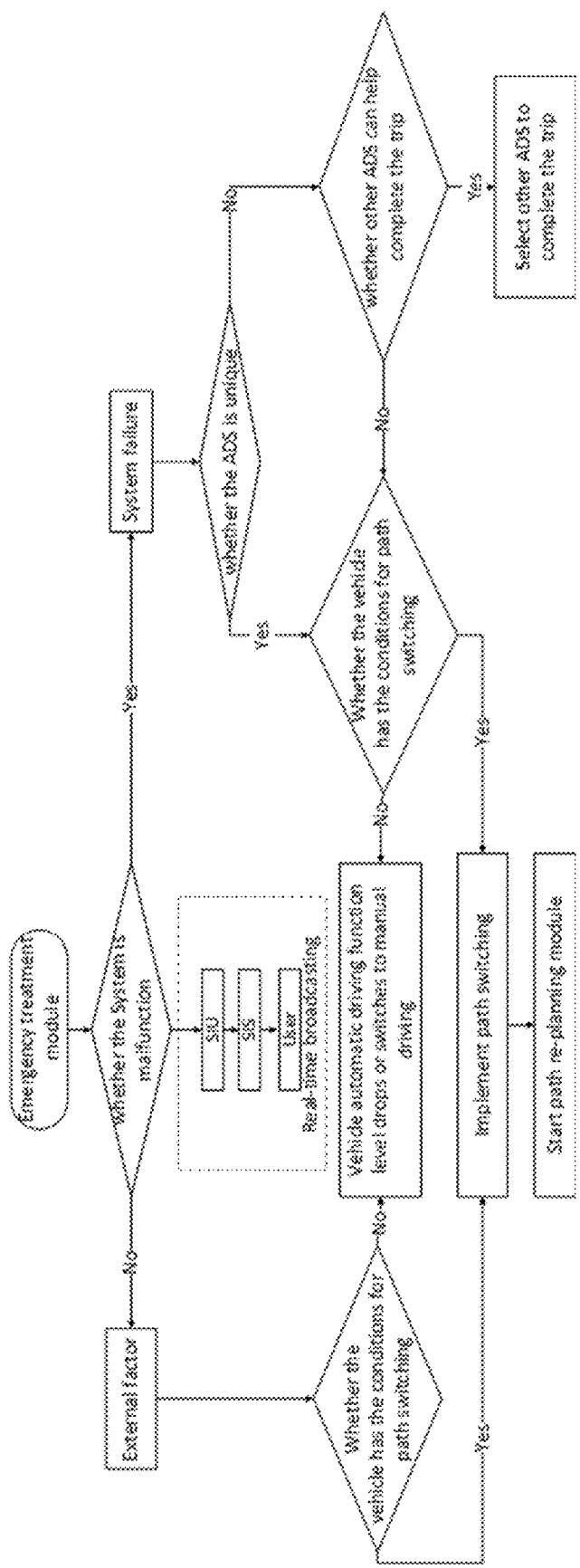
FIG. 9 is a flowchart showing a process performed by an emergency treatment module.

In some embodiments, e.g., as shown in FIG. 9, the technology provides an emergency treatment module (e.g., a module configured to perform an emergency treatment process). First, the emergency treatment module and/or process examines an emergency and determines the category of the emergency. In some embodiments, an emergency can be assigned to one of two categories: 1) system failure; and 2) external factors. System failure refers to the failure of the internal system to perform its functions. External factors include vehicle breakdown, road accident, weather conditions, etc. If the emergency situation belongs to the category of system failure, the system determines if the road section affected by the emergency is served by one ADS (e.g., presently providing automated driving to the vehicle) or more than one ADS (e.g., an ADS presently providing automated driving to the vehicle and one or more other ADS that is/are not providing automated driving to the vehicle). If the road section is served by one ADS, the system evaluates if the vehicle is capable of path switching. If the vehicle is capable of path switching, the system instructs the vehicle to implement path switching and starts a path re-planning module. If the vehicle is not capable of path switching, the vehicle automatic driving function or intelligence level (e.g., V) of the vehicle is decreased and/or the vehicle is switched to manual driving. If the road section is served by more than one ADS, the system evaluates if one or more other ADS has the ability to serve as a supplementary system to assist the vehicle complete the trip. If one of the other ADS has this ability, then the system selects the other ADS to complete the trip. If one of the other ADS does not have this ability, the system evaluates if the vehicle is capable of path switching as described above. If the emergency situation belongs to the category of external factors, the system evaluates if the vehicle is capable of path switching. If the vehicle is capable of path switching, the system instructs the vehicle to implement path switching and starts a path re-planning module. If the vehicle is not capable of path switching, the vehicle automatic driving function or intelligence level (e.g., V) of the vehicle is decreased and/or the vehicle is switched to manual driving. In some embodiments, the emergency treatment module is configured to broadcast information and/or instructions in real-time and/or the emergency treatment process comprises real-time broadcasting of information and/or instructions. This broadcasting function and/or process is a macroscopic function and/or process that transmits emergency information to a nearby SIU first and then transmits the emergency information from the SIU to the SIS. Finally, the SIS informs all relevant users on the road.

Figure 10:
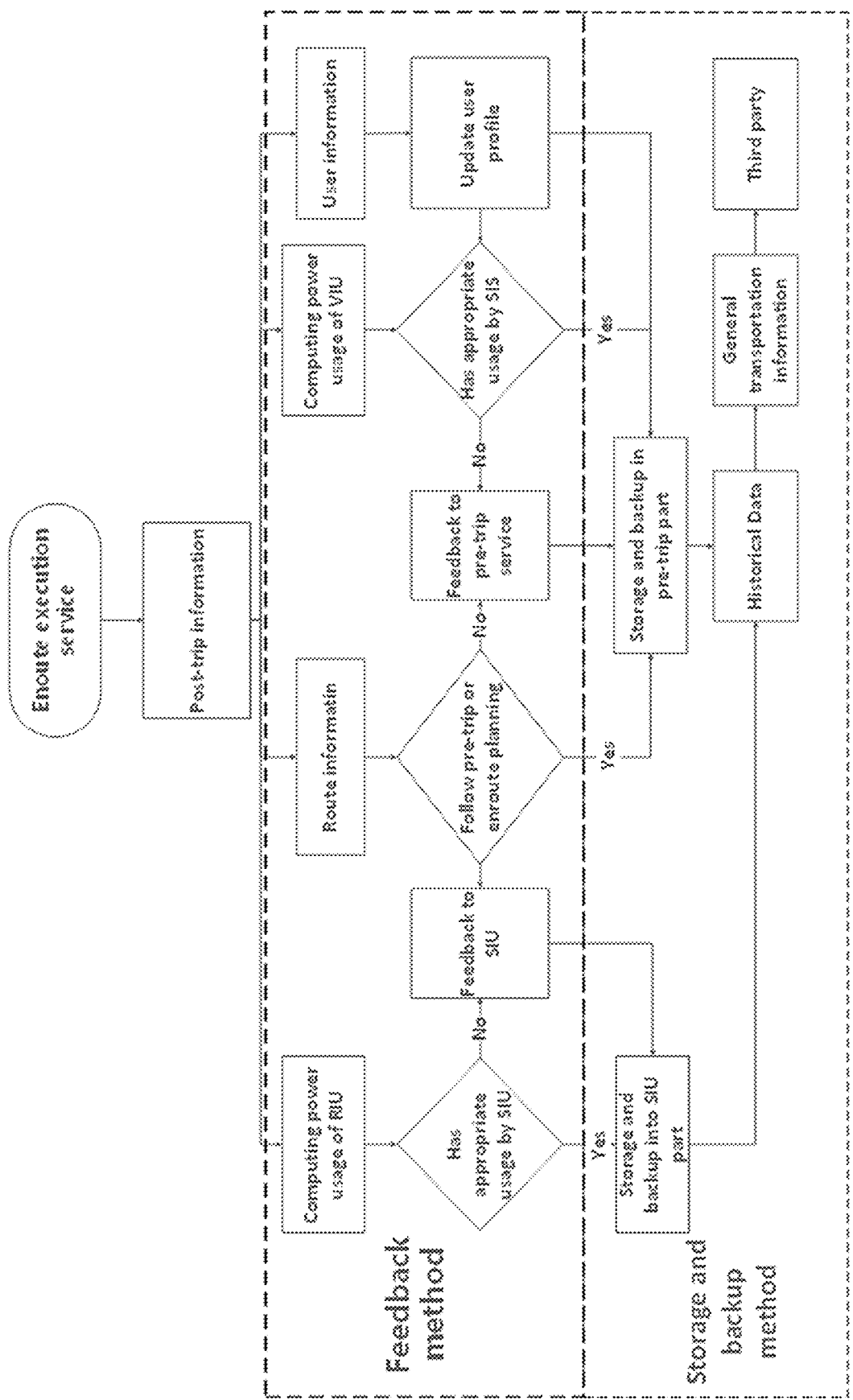
FIG. 10 is a flowchart showing a process for a post-trip service and storage and backup method performed by the SIS.

In some embodiments, e.g., as shown in FIG. 10, the technology provides a post-trip service (e.g., system and/or method). In some embodiments, the technology provides a storage and backup system and/or method for the SIS. The post-trip service comprises methods of feedback, storage, and backup. After the en route service is executed, post-trip information is collected and separated into four types of information: 1) computing resource usage of RIU; 2) route information; 3) computing resource usage of VIU; and 4) user information. For information describing the computing resource usage of RIU, the system provides feedback information to the pre-trip service describing if the VIU on the vehicle was connected with the SIU and/or the RIU that the pre-trip planning and/or en route planning service identified and/or assigned for the trip. If the pre-trip plan for RIU usage does not match the actual usage of RIU during the trip, the system records the reasons for the differences and adjusts and/or corrects the pre-trip model using the new information and/or difference information. For information describing the route, the system provides feedback information to the SIU describing the computing resource usage of the RIU, in particular to indicate if the allocation of computing resources to RIU was appropriate and/or sufficient for the automated driving during the trip. If the allocation of computing resources to RIU was not appropriate and/or was not sufficient, the system adjusts and/or corrects the model of choosing RIU for trips. For information describing the computing usage of VIU, the system provides feedback information to the pre-trip service describing the computing resource usage of VIU, in particular to indicate if the allocation of computing resources to the VIU by the SIS was appropriate and/or sufficient for the VIU to meet a target automated driving level for each segment of the trip. In some embodiments, different segments of the trip are served by any one or more of a plurality of different ADS. If the allocation of computing resources to the VIU by the SIS was not appropriate and/or not sufficient for the VIU to meet a target automated driving level for each segment of the trip, the SIS adjusts and/or corrects the pre-trip model.

For user information, the system updates the pre-trip profile and/or trip plan with information describing user comfort, route preference, time schedule, trip chain, and emergencies encountered. Information describing the computing resource usage of RIU and feedback information is stored and backed up by the SIU. Route information, computing resource usage of VIU, user information, and feedback information describing route information, computing resource usage of VIU, and user information are stored and backed up in the pre-trip profile and/or trip plan. Information stored and backed up in the pre-trip profile and/or trip plan and information stored and/or backed up by the SIU are classified and stored as historical data. In some embodiments, third-party systems are allowed access to general transportation information from the historical data.

Although the disclosure herein refers to certain illustrated embodiments, it is to be understood that these embodiments are presented by way of example and not by way of limitation.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A systematic intelligent system (SIS), comprising a system intelligent unit (SIU) configured to serve roadside intelligent units (RIUs) and vehicle intelligent units (VIUs), wherein said SIU comprises:
   (a) a storage unit comprising a storage device with a historical database that records historical data generated during trips and/or records historical data describing historical traffic conditions, historical road conditions, and/or historical information describing the route on other similar trips; and
   (b) a computing unit comprising a distribution manager and computing devices, wherein the distribution manager supplements computing resources of VIUs and RIUs; allocates tasks to VIUs and RIUs; and optimizes computing resources of RIUs and VIUs by allocating tasks and computing resources to RIUs and VIUs;
   wherein the SIS connects, manages, and controls a number of different automated driving systems (ADSes) that are provided by different manufacturers and/or a number of different ADSes that are provided by different ADS service providers;
   wherein the SIS manages control of a vehicle comprising a VIU by a plurality of different ADSes and thereby facilitates automated driving of the vehicle;
   wherein said distribution manager is configured to optimize RIU resources;
   wherein said distribution manager is configured to allocate resources from an idle RIU having spare resources to an RIU having insufficient resources;
   wherein each ADS of said plurality of ADSes comprises one or more of an RIU, a traffic control center, and/or a cloud component;
   wherein the SIS is configured to provide a pre-trip service, said pre-trip service is configured to train a model describing a trip, and said model is trained using historical data generated during previous trips to provide a trained model;
   wherein said trained model provides an optimized allocation of resources and functions among the SIU, the RIU, and the VIU; and
   wherein said pre-trip service is configured to perform a calibration and optimization function that calibrates and optimizes parameters of a profile model for a trip.

2. The SIS of claim 1, wherein the VIUs are in communication with a plurality of ADSes and each ADS of the plurality of ADSes has a different format and/or specification for primitive data and/or interfaces.

3. The SIS of claim 1, configured to manage control of the vehicle comprising a VIU by one or more RIU of one or more ADS.

4. The SIS of claim 1, configured to manage control of the vehicle comprising a VIU by switching control of said vehicle from a first RIU of a first ADS to a second RIU of a second ADS.

5. The SIS of claim 1, wherein the SIS manages control of the vehicle by one or more ADS during an entire trip.

6. The SIS of claim 1, wherein the SIS manages control of the vehicle during pre-trip, en route, and/or post-trip phases of a trip.

7. The SIS of claim 1, configured to perform:
   trip profiling and calibration methods;
   trip optimization methods;
   system data storage and/or backup methods; and/or
   system rewarding methods.

8. The SIS of claim 7, wherein said SIS is configured to perform trip profiling and calibration methods and said trip profiling and calibration methods are based on systematic intelligent databases.

9. The SIS of claim 7, wherein said SIS is configured to perform trip optimization methods and said trip optimization methods are for an entire trip.

10. The SIS of claim 1, configured to communicate with said RIUs and/or said VIUs using unified data interfaces and/or unified data formats.

11. The SIS of claim 1, comprising a computing module and/or a storage module.

12. The SIS of claim 1, configured to allocate tasks to VIUs and/or to RIUs.

13. The SIS of claim 1, configured to provide supplemental computing resources to VIUs and/or to RIUs.

14. The SIS of claim 1, configured to perform a distribution management method.

15. The SIS of claim 1, wherein said SIS comprises a distribution manager module.

16. The SIS of claim 1, configured to provide a pre-trip service.

17. The SIS of claim 1, configured to provide an en route service.

18. The SIS of claim 1, configured to provide a post-trip service.

19. The SIS of claim 7, wherein said SIS is configured to perform system data storage and/or backup methods and said system data storage and/or backup methods comprise storing and backing up information for the SIS.

20. The SIS of claim 7, wherein said system rewarding methods comprise selecting an ADS.

21. The SIS of claim 7, wherein said system rewarding methods comprise assigning a priority value to an ADS using information comprising user satisfaction, ADS intelligence level, and/or trip safety.

22. The SIS of claim 7, configured to select an ADS using a priority value assigned to said ADS.

23. The SIS of claim 7, configured to rank a plurality of ADSes using a priority value assigned to each ADS of said plurality of ADSes.

* * * * *